(12) United States Patent
Park

(10) Patent No.: US 12,280,853 B2
(45) Date of Patent: Apr. 22, 2025

(54) FLUID RESISTANCE REDUCTION APPARATUS FOR SHIP

(71) Applicant: Leen Chul Park, Busan (KR)

(72) Inventor: Leen Chul Park, Busan (KR)

( * ) Notice: Subject to any disclaimer, the term of this patent is extended or adjusted under 35 U.S.C. 154(b) by 522 days.

(21) Appl. No.: 17/844,108

(22) Filed: Jun. 20, 2022

(65) Prior Publication Data

US 2022/0315166 A1 Oct. 6, 2022

Related U.S. Application Data

(63) Continuation of application No. PCT/KR2020/001244, filed on Jan. 28, 2020.

(51) Int. Cl.
*B63B 1/34* (2006.01)
*B63B 1/40* (2006.01)

(52) U.S. Cl.
CPC . *B63B 1/34* (2013.01); *B63B 1/40* (2013.01)

(58) Field of Classification Search
CPC .................................. B63B 1/34; B63B 1/40
See application file for complete search history.

(56) References Cited

FOREIGN PATENT DOCUMENTS

| CN | 2306949 Y | 2/1999 |
|---|---|---|
| CN | 2350310 Y | 11/1999 |
| JP | S6061389 A * | 9/1983 |
| JP | 3118172 U | 1/2006 |
| JP | 2016-112950 A | 6/2016 |
| KR | 20-2010-0004331 U | 4/2010 |
| KR | 10-2015-0047812 U | 5/2015 |
| KR | 10-2018-0043459 A | 4/2018 |

OTHER PUBLICATIONS

International Search Report for PCT/KR2020/001244 mailed Oct. 22, 2020 from Korean Intellectual Property Office.
Office Action of Chinese Patent Application No. 20208088852 mailed Oct. 30, 2023.

\* cited by examiner

*Primary Examiner* — Stephen P Avila
(74) *Attorney, Agent, or Firm* — Revolution IP, PLLC

(57) ABSTRACT

The present invention relates to a fluid resistance reduction apparatus for a ship, and more particularly, to an apparatus for reducing fluid resistance of a ship, the apparatus capable of significantly reducing wave-making resistance as well as frictional resistance caused by seawater during navigation of a ship, thus improving the speed, allowing stable navigation, and saving fuel, wherein the fluid resistance reduction apparatus is disposed below the draft line of the hull and allows the ship to proceed while seawater is introduced through the bow due to rotation of a propeller disposed on the hull and is discharged through the back of the stern, thereby significantly reducing frictional resistance and wave-making resistance of seawater.

1 Claim, 3 Drawing Sheets

[FIG. 1]
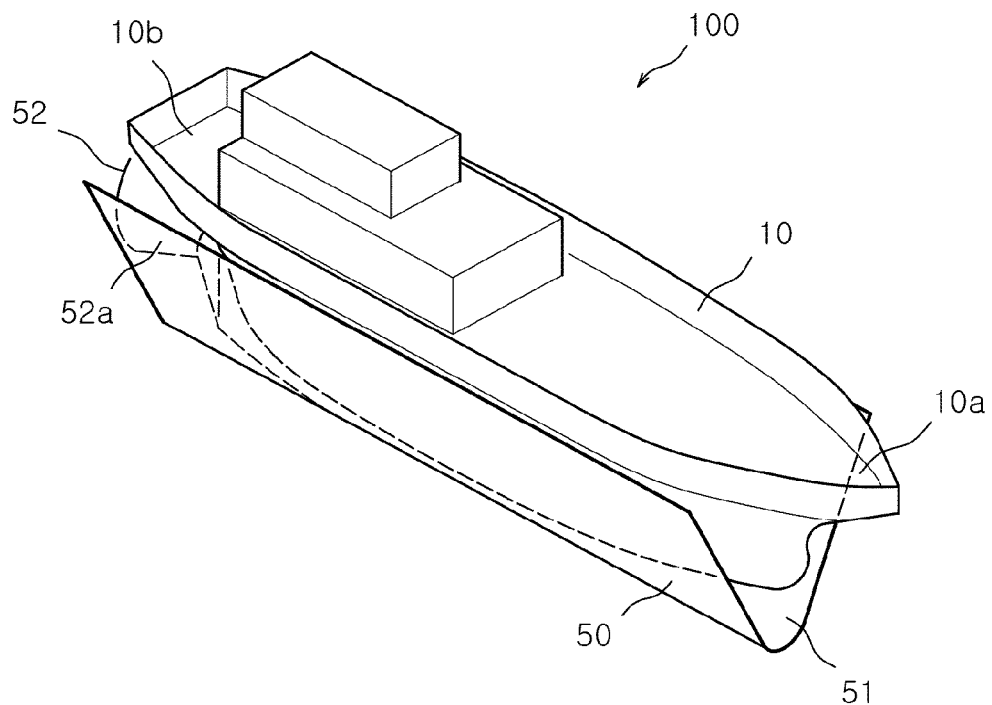
[FIG. 2]
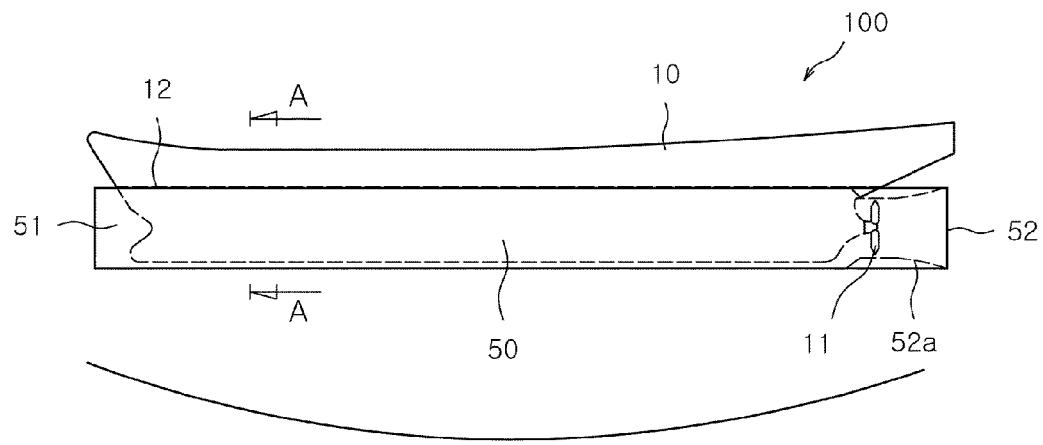

[FIG. 3]
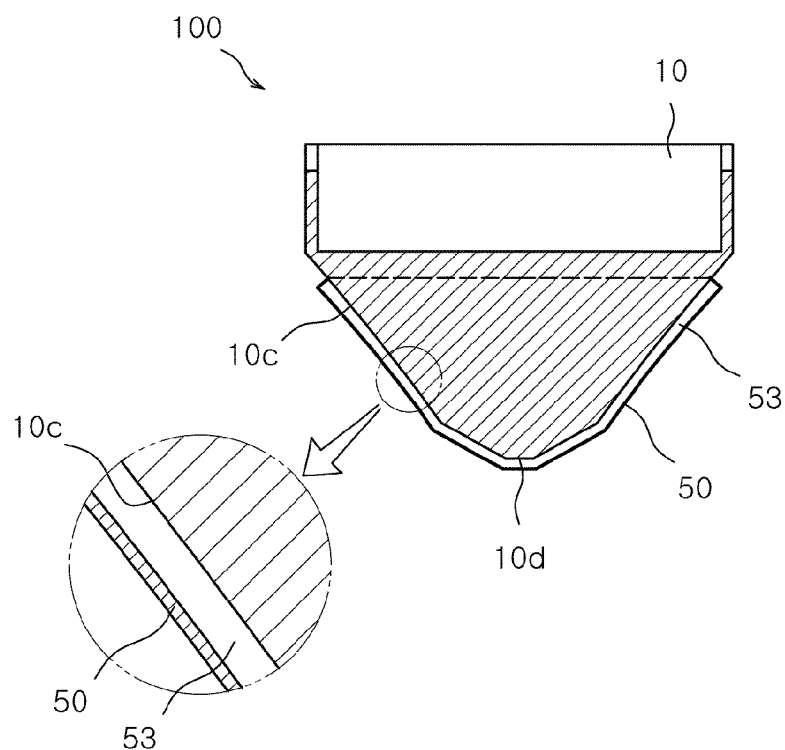
[FIG. 4]
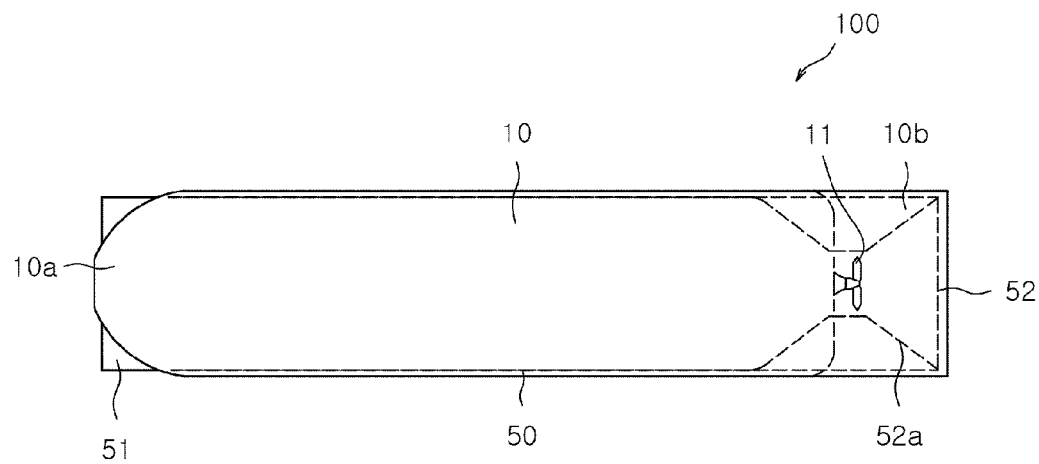

[FIG. 5]
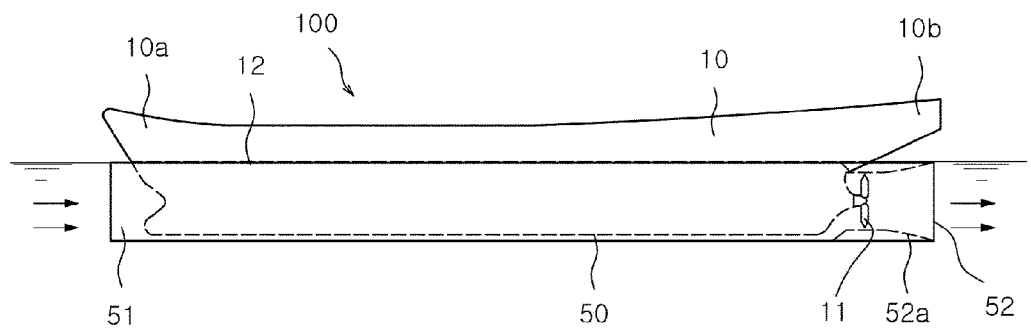

FLUID RESISTANCE REDUCTION APPARATUS FOR SHIP

TECHNICAL FIELD

The present invention relates to a fluid resistance reduction apparatus for a ship, and more particularly, to an apparatus for reducing fluid resistance of a ship, the apparatus capable of significantly reducing wave-making resistance as well as frictional resistance caused by seawater during navigation of a ship, thus improving speed, allowing stable navigation, and saving fuel.

BACKGROUND ART

Generally, a navigating ship receives fluid resistance caused by seawater, that is, frictional resistance and wave-making resistance due to forming waves on a water surface. In particular, frictional resistance accounts for a large part of the resistance that the hull receives from water, resulting in great energy loss during sailing, and at the same time, wave-making resistance also accounts for one part of the resistance that the hull receives from the water, causing loss of propulsion and resulting in energy loss that increases fuel consumption. Therefore, research in the field of hulls of ships has been focused on developing a hull form that can reduce frictional resistance and wave-making resistance.

As an example, in order to reduce frictional resistance, various methods have been devised, such as applying paint on a hull to reduce a frictional coefficient, spraying air bubbles to reduce frictional resistance, or making a surface of a hull to be smooth and have a streamlined shape like a dolphin's body, but such methods have not been that effective.

Also, a typical way of reducing wave-making resistance is by using a bulbous bow which is a bulb having a form that protrudes forward in a spherical shape from a bow below the water surface to create a wave that can offset a wave created by the bow to reduce a height of the wave formed near the bow, thus reducing wave-making resistance. However, since the bulbous bow is designed to have an optimal effect under a condition in which a ship maintains a fully loaded state and sails at a designated speed, there are problems that the bulbous bow rather increases wave-making resistance under actual sailing conditions in which a full load draft line and a designated speed are usually not maintained, and the length of the hull increases. Meanwhile, various other technologies for reducing fluid resistance caused by seawater have been proposed. For example, Japanese Unexamined Patent Application Publication No. 2016-112950 (Date of Publication: Jun. 23, 2016) discloses a technology in which a water conveyance tunnel is formed at a port and a starboard of a ship so that, while seawater passes through the water conveyance tunnel, fluid resistance is reduced, and hydroelectric power is generated. However, the technology is for generating hydroelectric power using a fluid passing through the water conveyance tunnel and is not able to reduce fluid resistance during sailing of the ship.

Also, Korean Utility Model Publication No. 20-2010-0004331 discloses a technology in which seawater that acts as a hydraulic pressure at the bow side is introduced through an intake and discharged with a high pressure to the stern side so that the bow-side hydraulic pressure of the ship is reduced, and propulsion increases at the stern side. However, despite having an effect of increasing propulsion, it is insufficient to reduce frictional resistance and wave-making resistance that are generated in a direction in which the ship proceeds when the ship sails.

In addition, Korean Patent Publication No. 10-2015-0047812 discloses a non-ballast system of a ship in which a seawater passage is formed in the ship and, when the ship is stopped or initially sails, a rotator in the seawater passage helps speed up the flow of seawater through a motoring operation, thus keeping the ship in equilibrium. According to this technology, the seawater passage only has an effect of keeping the ship in equilibrium, and does not have an effect of reducing frictional resistance and wave-making resistance.

Therefore, there is an urgent need for development of a technology that increases efficiency of reducing frictional resistance and wave-making resistance using a relatively simple structure.

DISCLOSURE

Technical Problem

The present invention is directed to providing an apparatus for reducing fluid resistance of a ship, the apparatus capable of guiding the flow of seawater in a direction in which the ship proceeds when the ship sails, thus significantly reducing frictional resistance caused by seawater colliding with the ship and wave-making resistance caused by waves, thereby improving speed, allowing stable navigation, and saving fuel.

Technical Solution

The present invention provides an apparatus for reducing fluid resistance of a ship, the apparatus including: a fluid flow guide plate which has a modified V-shape or U-shape whose two sides are installed at a predetermined gap so that, at an outer bottom portion of a hull of the ship that includes a propeller disposed on a stern, a fluid transfer passage is formed in a shape that surrounds the shape of the hull; a fluid inlet of the fluid flow guide plate that is formed at the bow side of the hull and formed to protrude in a direction in which the ship proceeds; a fluid outlet of the fluid flow guide plate that is formed at the stern side of the hull; and the fluid transfer passage configured to connect the fluid inlet and the fluid outlet, wherein the fluid outlet has a shape in which an inner diameter is reduced due to arc-shaped curved plates added to face an inner side of the fluid flow guide plate and which progressively expands toward an end to reach the same size as the fluid inlet, and the propeller is installed in the reduced inner diameter portion so that seawater forcibly introduced due to a rotational force of the propeller is promptly discharged due to the fluid outlet progressively expanding toward the end to reach the same size as the fluid inlet.

Advantageous Effects

According to the present invention, a fluid resistance reduction apparatus is disposed below the draft line of the hull and allows the ship to proceed while seawater is introduced through the bow portion due to rotation of a propeller disposed on the hull and is discharged through the back of the stern, thereby significantly reducing frictional resistance and wave-making resistance of seawater. In this way, in addition to improving a sailing ability, it is possible to improve speed and save fuel.

DESCRIPTION OF DRAWINGS

FIG. 1 is an exemplary perspective view illustrating a fluid resistance reduction apparatus for a ship and a ship including the same according to one embodiment of the present invention.

FIG. 2 is a lateral view illustrating the fluid resistance reduction apparatus for a ship and the ship including the same according to one embodiment of the present invention.

FIG. 3 is a cross-sectional view taken along line A-A of FIG. 2.

FIG. 4 is a schematic plan view of the fluid resistance reduction apparatus for a ship and the ship including the same according to one embodiment of the present invention.

FIG. 5 is a schematic lateral view illustrating an operational relationship of the ship including the fluid resistance reduction apparatus for a ship according to one embodiment of the present invention.

MODES OF THE INVENTION

Hereinafter, a fluid resistance reduction apparatus for a ship according to the present invention will be described in detail with reference to the accompanying drawings.

Before proceeding, it should be noted that the terms or words used in this specification and in the claims are not to be interpreted solely as the general or dictionary meanings, and they should be interpreted as the meanings and the concept which correspond with the technical spirit of the present invention based on the principle that the inventor can properly define the concept of the terms in order to explain his or her own invention in the best possible way.

Therefore, one embodiment described herein and configurations illustrated in the drawings are only the most preferred embodiment of the present invention and do not represent the entire technical spirit of the present invention, and thus it should be understood that various equivalents and modifications that can substitute therefor may be present at the time of filing this application.

FIG. 1 is an exemplary perspective view illustrating a fluid resistance reduction apparatus for a ship and a ship including the same according to one embodiment of the present invention, FIG. 2 is a lateral view illustrating the fluid resistance reduction apparatus for a ship and the ship including the same according to one embodiment of the present invention, FIG. 3 is a cross-sectional view taken along line A-A of FIG. 2, FIG. 4 is a schematic plan view of the fluid resistance reduction apparatus for a ship and the ship including the same according to one embodiment of the present invention, and FIG. 5 is a schematic lateral view illustrating an operational relationship of the ship including the fluid resistance reduction apparatus for a ship according to one embodiment of the present invention.

As illustrated in FIGS. 1 to 5, the fluid resistance reduction apparatus for a ship according to the present invention includes: a fluid flow guide plate 50 which has a modified V-shape or U-shape whose two sides are installed at a predetermined gap at an outer bottom portion of a hull 10 to surround the shape of the hull 10; a fluid inlet 51 of the fluid flow guide plate 50 that is formed at a bow 10a side of the hull 10; a fluid outlet 52 of the fluid flow guide plate 50 that is formed at a stern 10b side of the hull 10; and a fluid transfer passage 53 configured to connect the fluid inlet 51 and the fluid outlet 52.

The fluid flow guide plate 50 has a length that corresponds to a length of the hull 10, and the fluid inlet 51 and the fluid outlet 52 are formed to introduce and discharge seawater during sailing of a ship 100. In order to increase an amount of introduced seawater and an amount of discharged seawater while minimizing resistance of the seawater, the fluid inlet 51 at the bow 10a side has a width that corresponds to a width of the hull 10 and is formed to protrude in a direction in which the ship proceeds, and the fluid outlet 52 which is formed at the stern 10b side and formed to discharge seawater, which is introduced through the fluid inlet 51, to the rear has a shape in which an inner diameter is reduced due to arc-shaped curved plates 52a added to face an inner side of the fluid flow guide plate 50 and which progressively expands toward an end to reach the same size as the fluid inlet 51.

Meanwhile, in order to propel the hull 10, a propeller 11 disposed at the stern 10b side is located inside the fluid outlet 52. In particular, the propeller 11 is located in a narrow inner diameter portion between the arc-shaped curved plates 52a of the fluid outlet 52, and seawater is forcibly introduced and discharged due to a rotational force of the propeller, and the forcibly introduced seawater is promptly discharged through the fluid outlet which progressively widens toward the end to reach the same size as the fluid inlet.

Therefore, the propeller may be installed in the vicinity of the narrow inner diameter portion.

Also, the fluid transfer passage 53 is a transfer pipe formed inside the fluid flow guide plate 50 in order to guide the seawater introduced through the fluid inlet 51 to the fluid outlet 52 and discharge the seawater. The fluid transfer passage 53 is formed across the entire bottom portion of the hull 10 that is submerged in water.

In this way, the fluid inlet 51, the fluid outlet 52, and the fluid transfer passage 53 which are formed due to the fluid flow guide plate 50 constitute a type of fluid transfer pipe, through which a fluid is introduced and discharged during sailing of the ship 100, and may be formed to constitute a straight shape. It is apparent that the fluid transfer pipe may also be referred to as a nozzle or a duct, and the fluid transfer pipe may be referred to as any other name or have any other form as long as it is able to introduce a fluid causing resistance through the bow 10a side and discharge the fluid to the back of the stern 10b side.

Meanwhile, as illustrated in FIG. 2, the fluid flow guide plate 50 made of the fluid inlet 51, the fluid outlet 52, and the fluid transfer passage 53 is formed below a draft line 12, which is a limit line at which the hull 10 is submerged under water, and has a modified V-shape or U-shape that surrounds a hull side 10c and a hull bottom 10d.

Hereinafter, an operational relationship according to sailing of the ship 100 including the fluid resistance reduction apparatus for the ship 100 of the present invention will be described.

FIG. 5 is a schematic lateral view showing the operational relationship of the ship 100 including the fluid resistance reduction apparatus for the ship 100 according to one preferred embodiment of the present invention. Referring to FIG. 5, a portion of the hull 10 below the draft line 12 is submerged under water, and the fluid resistance reduction apparatus including the fluid flow guide plate 50 of the present invention is also submerged under water. In this state, when the propeller 11 is operated to rotate in order to move the hull 10 forward, in a process in which seawater is introduced through the fluid inlet 51 protruding in the proceeding direction at the bow 10a side of the hull 10 and is discharged through the fluid outlet 52 at the stern 10b side by the fluid flow guide plate 50 of the present invention, the fluid that causes resistance due to colliding with the bow 10a is discharged toward the stern 10b side, and thus resistance of the fluid is reduced.

In other words, when the ship 100 sails while the propeller 11 disposed inside the fluid outlet 52 of the fluid resistance reduction apparatus is operated to rotate, seawater in front of the bow 10a side may be introduced through the fluid inlet 51, which protrudes in the proceeding direction of the fluid flow guide plate 50, and then forcibly discharged to the back of the stern 10b through the fluid outlet 52 via the fluid transfer passage 53, and thus it is possible to significantly reduce fluid resistance in a direction in which the hull 10 proceeds.

In particular, the fluid inlet 51 formed at the bow 10a side of the fluid flow guide plate 50 is formed to have a wide width that corresponds to the width of the hull 10 and is formed to protrude in the direction in which the ship proceeds, and thus, while the ship 100 proceeds, the fluid colliding with the bow 10a is entirely accommodated in the fluid inlet 51 before acting as resistance on the hull and is discharged through the fluid outlet 52 via the fluid transfer passage 53. In this way, frictional resistance and wave-making resistance can be reduced.

Also, since the fluid flow guide plate 50 has a form that surrounds the hull side 10c and the hull bottom 10d below the draft line 12 of the hull 10, seawater stored in the fluid transfer passage 53 of the fluid flow guide plate 50 can serve as equilibrium water of the hull 10, and thus the hull 10 can have more stability during sailing.

To sum up, the fluid resistance reduction apparatus including the fluid flow guide plate 50 is disposed below the draft line 12 of the hull 10, and using rotation of the propeller 11 disposed on the hull 10, the hull 10 may proceed while seawater is introduced from the bow 10a portion and discharged to the back of the stern 10b. In this way, a phenomenon in which a fluid is pushed due to the hull proceeding is minimized, and when a propelling speed almost reaches a fluid discharge amount due to acceleration, a fluid located in the direction in which the hull proceeds acts as a foothold pushed by a screw rather than acting as a resistance, and a density of the fluid is beneficial to ship propulsion. Therefore, the present invention is useful in that it significantly reduces frictional resistance and wave-making resistance of seawater and achieves sailing ability improvement, speed improvement, and fuel saving effects.

The invention claimed is:

1. An apparatus for reducing fluid resistance of a ship, the apparatus comprising:
   a fluid flow guide plate (50) which has a modified V-shape or U-shape whose two sides are installed at a predetermined gap so that, at an outer bottom portion of a hull (10) of the ship (100) that includes a propeller (11) disposed on a stern (10b), a fluid transfer passage (53) is formed in a shape that surrounds the shape of the hull (10);
   a fluid inlet (51) of the fluid flow guide plate (50) that is formed at the bow (10a) side of the hull (10) and formed to protrude in a direction in which the ship proceeds;
   a fluid outlet (52) of the fluid flow guide plate (50) that is formed at the stern (10b) side of the hull (10); and
   the fluid transfer passage (53) configured to connect the fluid inlet (51) and the fluid outlet (52),
   wherein the fluid outlet (52) has a shape in which an inner diameter is reduced due to arc-shaped curved plates (52a) added to face an inner side of the fluid flow guide plate (50) and which progressively expands toward an end to reach the same size as the fluid inlet (51), and the propeller (11) is installed in the reduced inner diameter portion so that seawater forcibly introduced due to a rotational force of the propeller (11) is promptly discharged due to the fluid outlet progressively expanding toward the end to reach the same size as the fluid inlet.

* * * * *